(12) United States Patent
Schlimmer et al.

(10) Patent No.: US 7,664,828 B2
(45) Date of Patent: Feb. 16, 2010

(54) INVALID POLICY DETECTION

(75) Inventors: Jeffrey C. Schlimmer, Redmond, WA (US); David Levin, Redmond, WA (US); Alfred Lee, IV, Seattle, WA (US); Erik B. Christensen, Seattle, WA (US); Bradford H. Lovering, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

(21) Appl. No.: 10/783,776

(22) Filed: Feb. 20, 2004

(65) Prior Publication Data

US 2005/0198326 A1 Sep. 8, 2005

(51) Int. Cl.
*G06F 15/173* (2006.01)
*G06F 13/00* (2006.01)

(52) U.S. Cl. .................. 709/217; 711/118; 711/163; 726/19; 709/203

(58) Field of Classification Search ........................ None
See application file for complete search history.

(56) References Cited

U.S. PATENT DOCUMENTS

| | | | |
|---|---|---|---|
| 5,224,098 A | 6/1993 | Bird et al. | |
| 5,425,028 A | 6/1995 | Britton et al. | |
| 5,530,832 A | 6/1996 | So et al. | |
| 5,764,887 A | 6/1998 | Kells et al. | |
| 5,845,081 A | 12/1998 | Rangarajan et al. | |
| 5,894,557 A | 4/1999 | Bade et al. | |
| 5,941,947 A | 8/1999 | Brown et al. | |
| 5,987,517 A | 11/1999 | Firth et al. | |
| 6,243,759 B1 | 6/2001 | Boden et al. | |
| 6,338,117 B1 | 1/2002 | Challenger et al. | |
| 6,430,576 B1 * | 8/2002 | Gates et al. | 707/201 |
| 6,519,636 B2 | 2/2003 | Engel et al. | |
| 6,519,764 B1 * | 2/2003 | Atkinson et al. | 717/120 |
| 6,545,599 B2 | 4/2003 | Derbyshire et al. | |
| 6,598,121 B2 | 7/2003 | Challenger et al. | |
| 6,643,684 B1 | 11/2003 | Malkin et al. | |
| 6,662,235 B1 | 12/2003 | Challis et al. | |
| 6,694,368 B1 | 2/2004 | An et al. | |
| 7,000,006 B1 | 2/2006 | Chen | |
| 7,020,645 B2 * | 3/2006 | Bisbee et al. | 707/1 |

(Continued)

OTHER PUBLICATIONS

Hypertext Transfer Protocol—HTTP/1.1; World Wide Web Consortium (W3C); http://www.w3.org/Protocols/rfc2626/rfc2616-sec12.html; Chapter 12, pp. 46-47.

(Continued)

*Primary Examiner*—Gary J Portka
(74) *Attorney, Agent, or Firm*—Lee & Hayes, PLLC

(57) ABSTRACT

Implementations are described and claimed herein to detect an invalid policy that may reside in a cache at a client. An expired policy is removed from cache and a current policy is requested. Otherwise the cached policy may be used. The client indicates which policy it is using by generating a policy digest, including, in compressed form, one or more assertions. If the host determines the policy digest is invalid, the host issues an invalid digest fault. If the policy digest is valid, but the assertions included in the policy digest are invalid, the host issues an invalid policy fault. In either case, the client is notified that the cached policy is no longer valid and that a current policy should be requested.

36 Claims, 7 Drawing Sheets

U.S. PATENT DOCUMENTS

| | | |
|---|---|---|
| 7,054,332 B2 | 5/2006 | Favichia et al. |
| 7,089,313 B2 | 8/2006 | Lee et al. |
| 7,181,537 B2 | 2/2007 | Costa-Requena et al. |
| 7,185,364 B2 | 2/2007 | Knouse et al. |
| 2003/0149781 A1 | 8/2003 | Yared et al. |
| 2004/0015421 A1 | 1/2004 | Erfurt et al. |
| 2004/0117494 A1 | 6/2004 | Mitchell et al. |
| 2004/0167984 A1* | 8/2004 | Herrmann .................. 709/229 |
| 2004/0215824 A1 | 10/2004 | Payrits |
| 2005/0053007 A1 | 3/2005 | Bernhardt et al. |
| 2005/0080914 A1 | 4/2005 | Lerner et al. |
| 2005/0198206 A1 | 9/2005 | Miller et al. |
| 2007/0192827 A1 | 8/2007 | Maxted et al. |
| 2007/0234417 A1 | 10/2007 | Blakley, III et al. |
| 2008/0056500 A1 | 3/2008 | Bradley et al. |

OTHER PUBLICATIONS

Bauer, Lujo, et al.; "A General and Flexible Access-Control System for the Web"; Copyright 2002 by the USENIX Association; San Francisco, California; Aug. 5-9, 2002; 17 pages.

Verma, Dinesh C. et al.; "Policy-Based Management of Content Distribution Networks"; IEEE Network, The Magazine of Global Internetworking; Mar./Apr. 2002; vol. 16, No. 2, pp. 34-39.

* cited by examiner

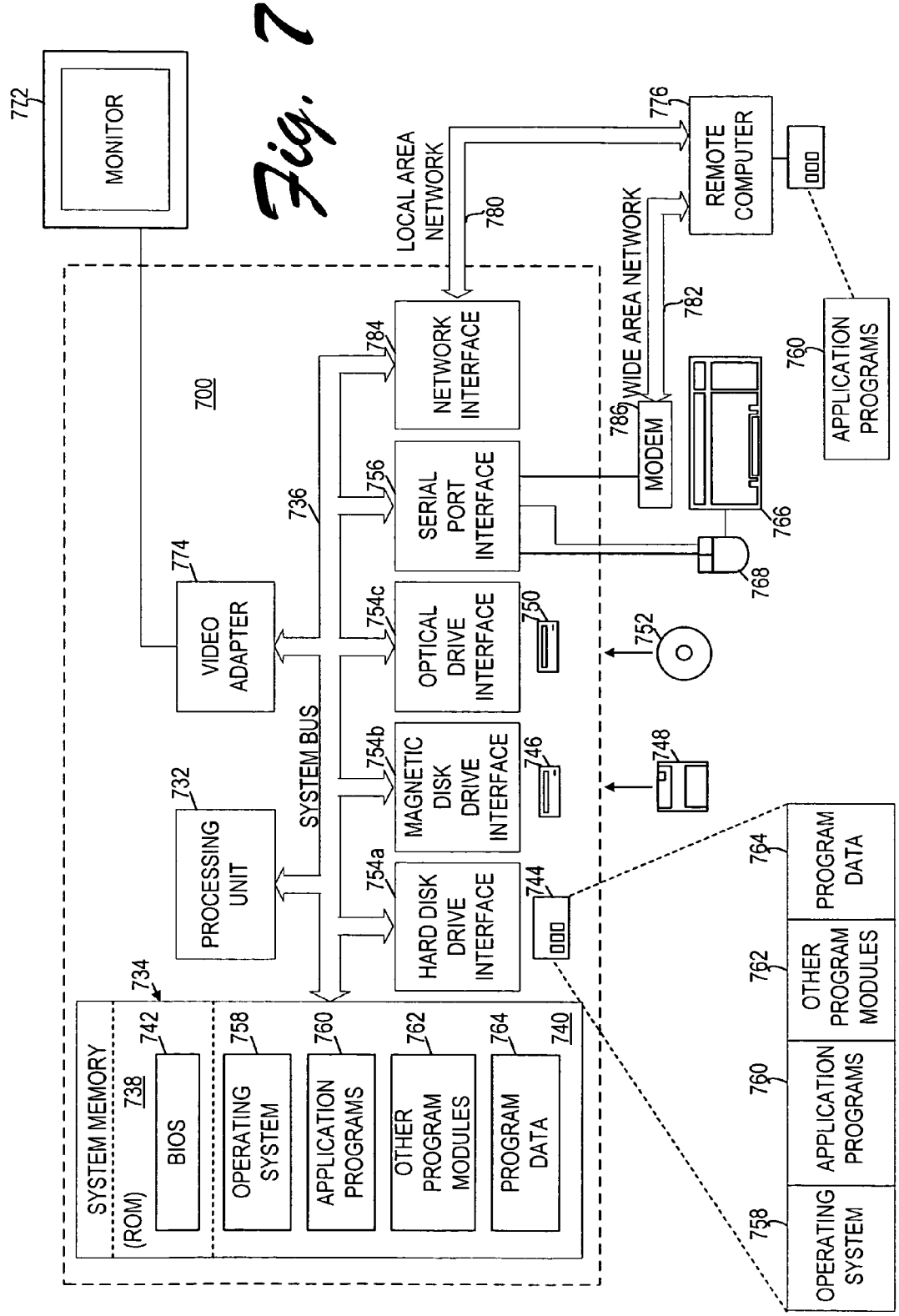

INVALID POLICY DETECTION

RELATED APPLICATIONS

This patent application is related to co-owned U.S. patent application Ser. No. 10/783,554 and U.S. patent application Ser. No. 10/783,751, each hereby incorporated herein for all that is disclosed.

TECHNICAL FIELD

The described subject matter relates to electronic computing, and more particularly to systems and methods of invalid policy detection in electronic computing systems.

BACKGROUND

Communication between various computing devices (e.g., personal computers, server computers, mobile devices) is increasingly commonplace in a number of network environments, such as, e.g., the Internet and corporate intranets to name only a few examples. Often, these computing devices are configured for communication in accordance with preferred or even required formats. As an illustration, a commercial web site may require a user's computer to comply with one or more assertions before the user is granted access to the payment web pages. These assertions may be specified in one or more policies and may be either general or security related. For example, an assertion may require that incoming messages be encoded according to a particular encryption scheme for security purposes, or that incoming messages be formatted using a particular compression scheme to facilitate efficient transaction processing.

The user's computer, or client, may request a copy of a policy from a host (e.g., a server at the commercial website). The client reads the assertions included in the policy and complies with one or more of the assertions to communicate with or access resources via the host. The client may also store a copy of the policy in a cache so that the client does not have to request another copy of the policy the next time the client communicates with the host. However, policies may be changed (e.g., to implement updated encryption schemes). Accordingly, a client that is using an "old" policy from cache may no longer be complying with valid assertions when attempting to communicate with or access resources via the host.

If the client is not complying with valid assertions, the host may simply ignore messages from the client. Optionally, the host may issue an error message. However, these error messages are also used to indicate other types of errors. For example, an "invalid action" message may also be issued in response to the client attempting to access a resource that does not exist. An "invalid security" message may also be issued in response to the client submitting improper security credentials. These messages do not indicate to the client that the cached policy is invalid, and the client may continue to use the cached policy, albeit unsuccessfully.

SUMMARY

Implementations are described and claimed herein to detect an invalid policy that may reside in a cache at a client. According to one implementation, a policy is removed from cache if it expires. If the cached policy is expired, a current policy is requested. Otherwise the cached policy may be used to communicate with a host. The client indicates which policy it is using by generating a policy digest, including, in compressed form, the policy identity and one or more assertions that the client is complying with. The client sends the policy digest to the host, e.g., as part of a message header.

If the host determines the policy identity is invalid, the assertions do not need to be evaluated and the host issues an invalid digest fault. If the policy is valid, but the assertions indicated by the policy digest are invalid, the host issues an invalid policy fault. In either case, the client is notified that the cached policy is no longer valid and that a current policy should be requested.

In some implementations, articles of manufacture are provided as computer program products. One implementation of a computer program product provides a computer program storage medium readable by a computer system and encoding a computer program for invalid policy detection. Another implementation of a computer program product may be provided in a computer data signal embodied in a carrier wave by a computing system and encoding the computer program for invalid policy detection.

The computer program product encodes a computer program for executing a computer process on a computer system to generate a policy digest for a cached policy at a client. The policy digest identifies the policy and at least one assertion that the client is complying with. The policy digest is included in a request by the client to access a resource.

In another implementation of the computer program product, a computer process extracts at a host a policy digest identifying a cached policy from a request to access a resource; and grants access to the resource if the policy digest identifies a valid policy.

In yet another implementation, a method is provided. The method includes generating a policy digest for a cached policy at a client, the policy digest identifying the policy and at least one assertion that the client is complying with. The policy digest is included in a request by the client to access a resource.

In another implementation, a method includes extracting at a host a policy digest identifying a cached policy from a request to access a resource. Access is granted to the resource if the policy digest identifies a valid policy (and the host verifies that the request complies with the indicated assertions).

In yet another implementation, a system is provided including a policy digest identifying at least one cached policy. A messaging module grants access to a resource if the policy digest identifies a valid policy for the resource (and the host verifies that the request complies with the indicated assertions).

In another implementation of the system, a policy digest identifies the policy and at least one assertion that the client is complying with. A messaging module includes the policy digest in a request by the client to access a resource.

BRIEF DESCRIPTION OF THE DRAWINGS

FIG. 7 is a schematic illustration of an exemplary computing device that can be utilized to implement invalid policy detection.

DETAILED DESCRIPTION

Briefly, invalid policy detection may be implemented for a client attempting to access a host resource (or otherwise communicate with a host computer) in a network environment, such as, e.g., the Internet or an intranet. For purposes of illustration, a user may attempt to access a secure payment web page to make a purchase at a commercial web site. Before the user is able connect to the secure payment web page, however, the host has to be assured that the client is complying with at least one assertion included in a policy associated with the resource. For example, the assertions may require that messages sent by the client comply with a specified encryption scheme, compression scheme, or passport signature.

In operation, the client retrieves a copy of the policy from cache and determines whether the cached policy is current or expired. If the cached policy is expired, the client requests a current policy from the host. If the cached policy is current, the client can use the cached policy to access, e.g., the secure payment website, by complying with one or more of the assertions included in the cached policy. The client identifies the cached policy and indicates which assertions the client is complying with by generating a policy digest and sending the policy digest to the host to validate.

The host receives the policy digest from the client (e.g., as part of a message header) and determines if the client is complying with a valid policy. If the policy identified by the policy digest is invalid, the host returns a fault notifying the client that the cached policy is no longer valid and a current policy will need to be requested before the secure payment web page (or other host resource) can be accessed.

Accordingly, the client receives informative feedback and can readily determine whether the cached policy is valid or should be removed from cache. In addition, the host is able to quickly process messages from a client by evaluating a compressed policy digest indicating the particular assertions that the client is complying with. The host only has to validate assertions indicated in the policy digest and does not have to test every potential assertion. The declarative nature of the policy digest also mitigates against attackers who may insert destructive tokens in the message at intermediary points in the network.

Exemplary System

Figure 1:
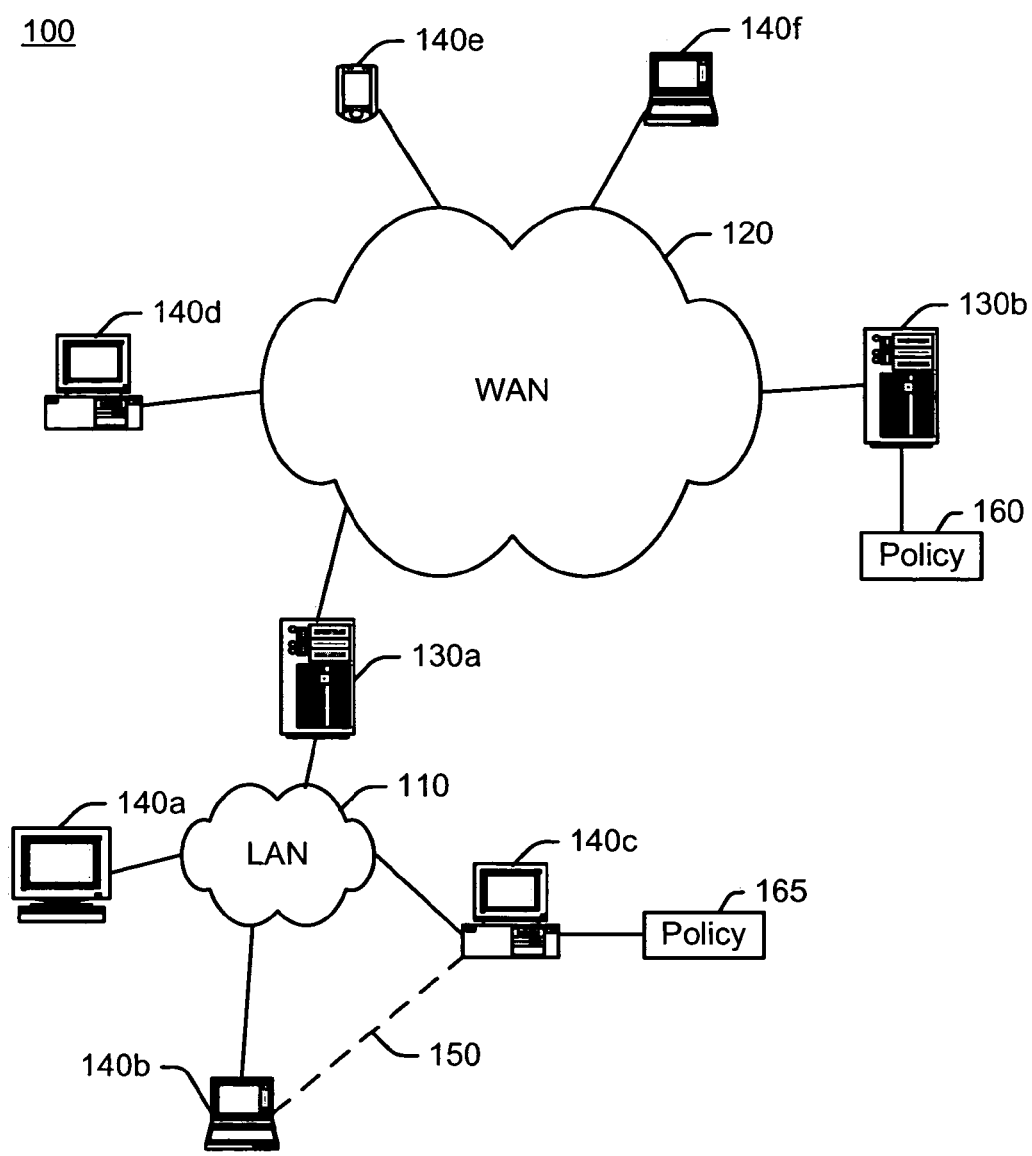
FIG. 1 is a schematic illustration of an exemplary computer network that may implement policy-based communication.

FIG. 1 is a schematic illustration of an exemplary networked computing system 100 in which invalid policy detection may be implemented. The networked computer system 100 may include one or more communication networks, such as local area network (LAN) 110 and/or wide area network (WAN) 120. One or more hosts 130a, 130b and client devices 140a-f may be linked over the communication network(s) 110, 120.

Hosts 130a, 130b and clients 140a-f connect to a network via a communication connection such as, e.g., an Ethernet connection. Alternatively, a host and/or client can connect directly, as illustrated by direct connection 150. Although there are no theoretical limits on the number of hosts and clients that can be included in a network such as computer network 100, the number of hosts and clients are limited primarily by the connectivity implemented in the communication network.

The terms "client" and "host" both refer to the hardware and software (the entire computer system) used to perform various computing services. The computer system may be implemented as a server computer that is dedicated to server applications or that also runs other applications. Alternatively, the computer system may include, by way of illustration, stand-alone personal desktop or laptop computers (PCs), workstations, personal digital assistants (PDAs), or electronic appliances, to name only a few examples.

As used herein, the client is the computer system that is used to access a resource at another computer system (i.e., the host). Resources available via the host may include other computing or data processing systems, storage, or other devices. The host may also provide the client with other services, such as transaction processing, email services, etc. A secured host can also determine whether the client is allowed access to private resources, provide authorized users access to private resources, and generate audit messages (e.g., in an event log) when the client attempts to access private resources.

Although the host may be implemented as a server computer and a client may be implemented as, e.g., a personal computer or workstation, any computer system can serve as a client and/or as a host. As an illustration, if a network workstation is accessing a resource via a front-end server, the network workstation is referred to herein as the client and the front-end server is referred to herein as the host. However, if the front-end server is accessing a resource via a back-end server, the front-end server is referred to herein as the client and the back-end server is referred to herein as the host. As another illustration, if a first PC is accessing a resource via a second PC (e.g., peer-to-peer), the first PC is referred to herein as the client and the second PC is referred to herein as the host.

A client may communicate with a host according to one or more policies 160, 165 bound to a policy subject, such as, e.g., a resource at the host. Generally, a policy is an informal abstraction of information referred to as assertions. An assertion represents an individual preference, requirement, capability, or other property that a client may, or in some circumstances, must comply with in order to access the resource via (or otherwise communicate with) the host. Assertions may be either general or security-related.

In an exemplary implementation, the Web Services Policy (WS-Policy) specification defines a general model and syntax for policy expressions and assertions. The policy may be expressed in machine-readable extensible markup language (XML) format to facilitate interoperability between different platforms and web services infrastructure. Of course a policy is not limited to any particular syntax or format and other implementations are also possible.

During operation, a client may request a copy of one or more policies from a host. The client may store the policy locally, e.g., in cache. The client is then able to access the policy from cache for other interactions with the host and does not have to request another copy of the policy each time the client interacts with the host. If the cached policy becomes invalid, the client removes the policy from cache and requests a valid policy from the host.

Figure 2:
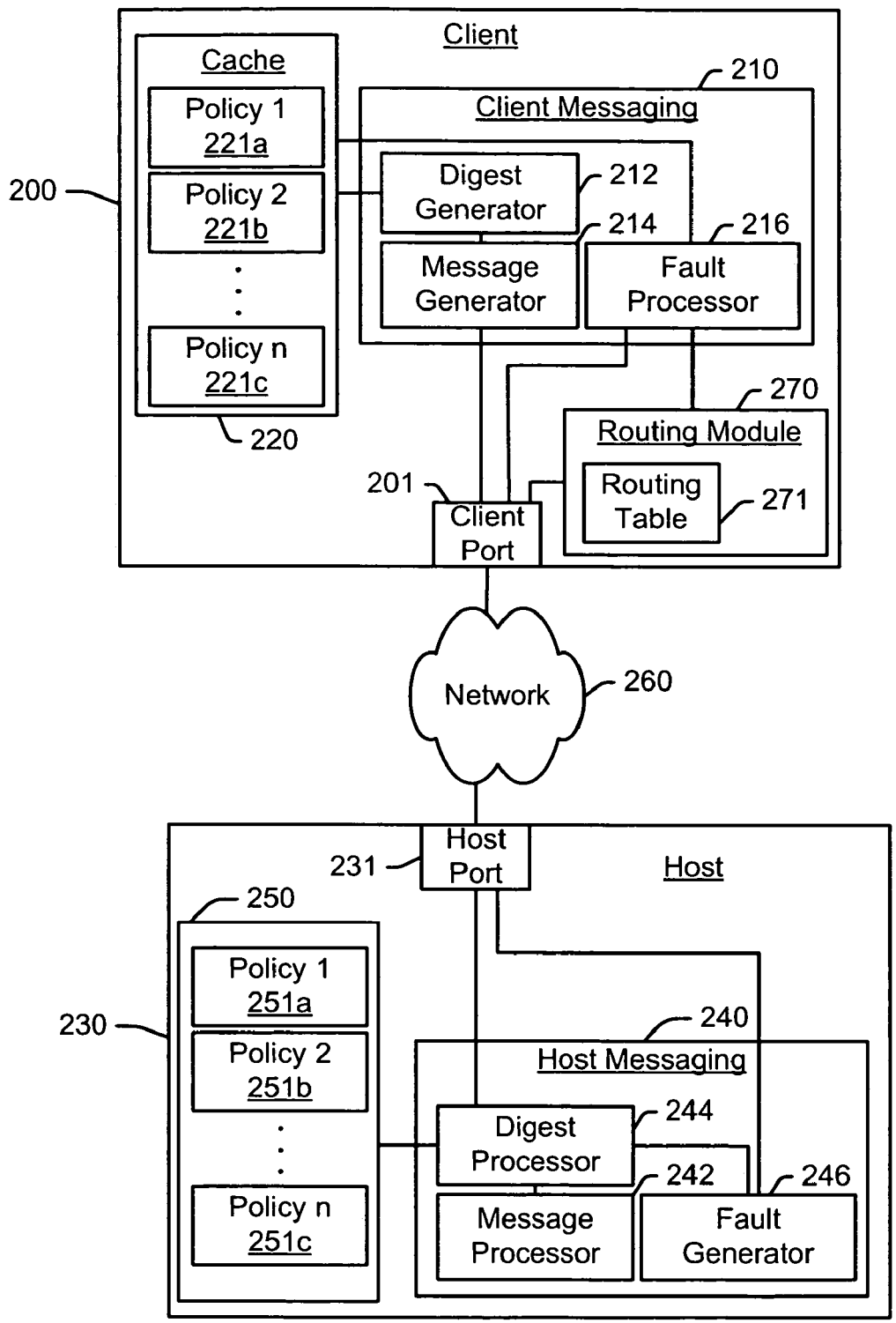
FIG. 2 is a schematic diagram of an exemplary client and host implemented to detect an invalid policy.

FIG. 2 is a schematic diagram of an exemplary client and host that may be implemented to detect an invalid policy. Client 200 connects to a host 230 via a network 260 or direct connection (e.g., as illustrated in FIG. 1 by connection 150). In FIG. 2, client 200 connects to the network 260 via client port 201 and host 230 connects to the network 260 via host port 231.

Referring to FIG. 2, client 200 includes a client messaging module 210 to process messages. Client messaging module 210 is operatively associated with a cache 220 including one or more cached policies 221a, 221b, 221c (hereinafter generally referred to as 221). The client 200 may comply with assertion(s) included in one or more of the cached policies 221 to communicate with the host 230.

In an exemplary implementation, client messaging module 210 may communicate with the host 230 using Simple Object Access Protocol (SOAP). SOAP is a messaging protocol used to encode transactions for transfer over a network using any of a variety of Internet protocols (e.g., HTTP, SMTP, MIME). SOAP messages do not need to be formatted for use with any particular operating system, making SOAP messages commonplace in network environments.

Client messaging module 210 may be implemented in computer-readable program code (e.g., software and/or firmware) stored in computer-readable storage or memory and executable by a processor (or processing units) at the client 200. Client messaging module 210 may include a digest generator 212, a message generator 214, and a fault processor 216.

Digest generator 212 may be implemented to generate a policy digest of one or more policies stored in cache 220. Techniques to generate a policy digest are described in more detail below with reference to FIG. 3. For now it is sufficient to understand that the policy digest includes the identity of at least one policy and at least one assertion in a compressed format. Accordingly, the policy digest can be added to a message (e.g., as part of the header) and sent to the host 230 without having to include a copy of the entire policy.

Message generator 214 may be implemented to generate messages at the client. Message generator 214 may also include a copy of the policy digest as part of the message (e.g., in the message header) to identify the policy and assertion(s) that the client is complying with. For purposes of illustration, a message may include a request to access a resource at host 230. The policy digest may identify one or more policies and assertions that client 200 is complying with so that the host 230 will grant the client 200 access to the resource.

Fault processor 216 may be implemented to process faults received by client 200 in response to a message that the client sent. For example, if the host 230 determines that client 200 is not complying with a valid policy, the host 230 may issue a fault. Fault processor 216 reads the fault and determines which policy is invalid so that the client messaging module 210 can remove the invalid policy from cache 220 and request a valid policy before attempting to access the resource at host 230.

Still referring to FIG. 2, host 230 includes a host messaging module 240 to process messages at the host. Host messaging module 240 is operatively associated with computer-readable storage or memory 250 including one or more policies 251a, 251b, 251c (hereinafter generally referred to as 251). Host messaging module 240 may request, or in some circumstances, require that a client 200 comply with one or more of the policies 251.

Host messaging module 240 may be implemented in computer-readable program code (e.g., software and/or firmware) stored in computer-readable storage or memory and executable by a processor (or processing units) at the host 230. Host messaging module 240 may include a message processor 242, a digest processor 244, and a fault generator 246.

Message processor 242 may be implemented to process messages at the host 230. For purposes of illustration, the message may include a request to access a resource at host 230. The message processor 242 extracts the policy digest, which is processed by the digest processor 244 to determine whether the client is complying with a valid policy. Techniques to extract a policy digest and determine whether the client is complying with a valid policy are described in more detail below with reference to FIG. 3. If the host is complying with a valid policy, the message processor 242 may process the message to grant the client 200 access to the resource at the host 230.

Fault generator 246 may be implemented to generate faults when a client is not complying with a valid policy. Fault processor 216 generates a fault that can be returned to the client 200 so that the client 200 can remove the invalid policy from cache 220 and request a valid policy before attempting to access the resource at host 230. The fault may trigger a diagnostic event at the client 200 to indicate a system problem. For example, the diagnostic event may be or displayed for the user or logged for a system administrator's review.

It is noted that the client messaging module 210 and the host messaging module 240 are not limited to the exemplary implementation shown in FIG. 2. For example, the functions do not need to be embodied in separate modules. In yet other implementations, additional functional components may also be included.

Client 200 may also include a routing module 270 operatively associated with a routing table 271. Routing table 271 defines one or more network paths to route messages to the host. Routing module 270 may be implemented as computer-readable program code (e.g., software and/or firmware) stored in computer-readable storage or memory and executable by a processor (or processing units) at the client 200.

Routing module 270 may be operatively associated with the fault processor 216. When the fault processor 216 receives a fault that indicates a host is no longer available, fault processor 216 notifies routing module 270 to update the routing table 271 by removing the unavailable host from the routing table 271.

Figure 3:
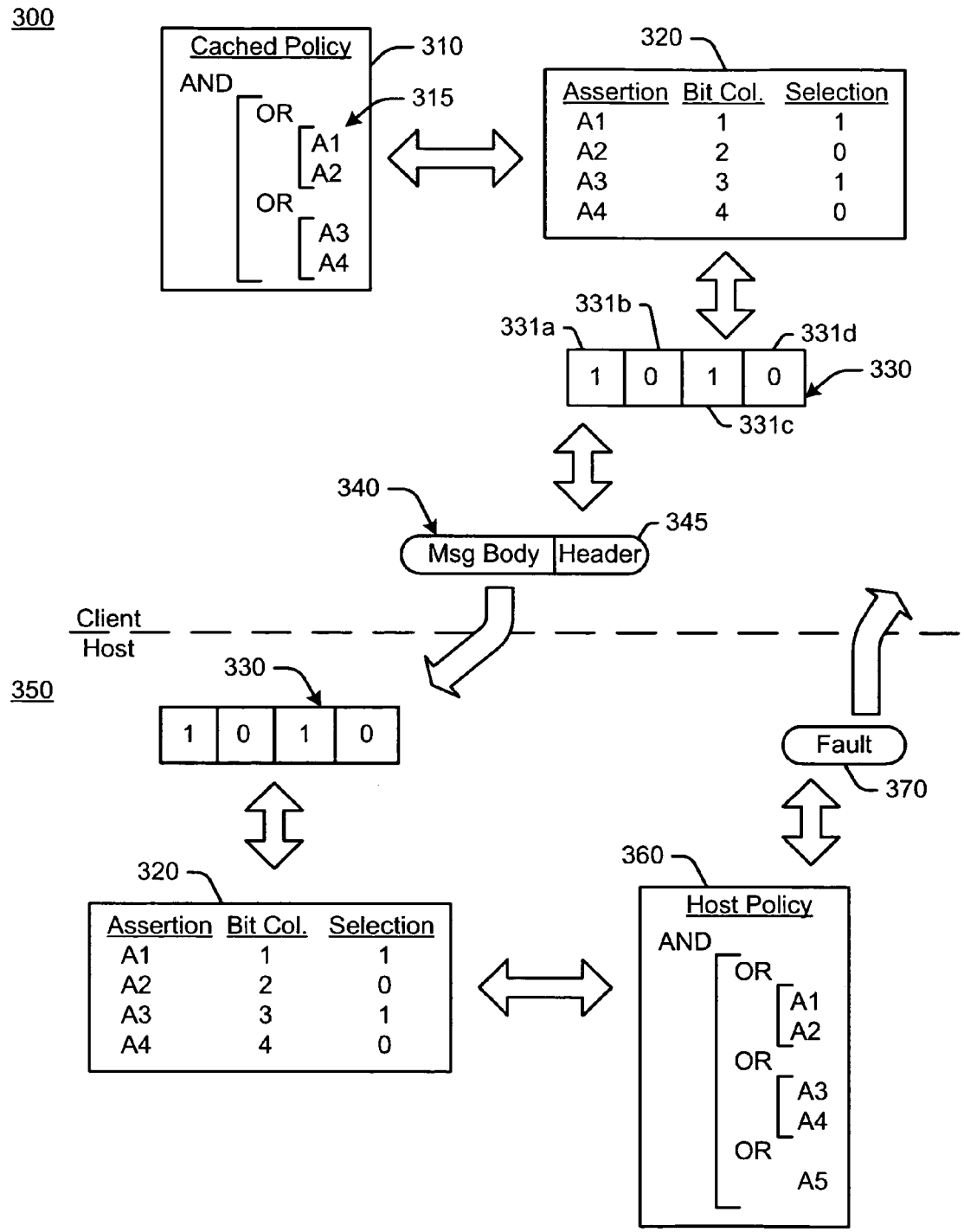
FIG. 3 is a high-level diagram illustrating an exemplary implementation of invalid policy detection.

FIG. 3 is a high-level diagram illustrating an exemplary implementation of invalid policy detection. A cached policy 310 may include one or more assertions 315. For purposes of illustration, exemplary cached policy 310 includes assertions (A1 or A2) and (A3 or A4).

In operation, a client 300 may have to comply with one or more policies to access a resource at a host 350. The client 300 determines if it has previously received a policy from the host 350 and stored it in cache. The client 300 accesses the cached policy 310 and selects assertions to comply with.

The client 300 may generate a policy digest 320 to identify the policy (or policies) and selected assertion(s). In an exemplary implementation, policy digest 320 is a canonicalized XML document. Policy digest 320 may be generated, for example, by computing a policy identity, and identifying selected assertions within that policy (or policies).

The policy identity may be computed by hashing the text representation of the policy. For example, a cryptographic hash function (e.g., MD5) may be used to compute the policy identity as a binary value. MD5 is an algorithm that takes input of arbitrary length and produces a 128 bit "fingerprint" of the input. The MD5 algorithm is commonly used for digital signature applications where a large file must be compressed in a secure manner before being encrypted with a private key under a public key implementation. Of course other implementations now known or later developed may also be used.

The binary value may be encoded as a text value (e.g., using base64 encoding), which is included in the policy digest in XML format. Base64 encoding is specified in the Network Working Group's Request for Comments (RFC 2045—Multipurpose Internet Mail Extensions). Base64 encoding uses a 64 character subset (A-Za-z0-9+/) to represent binary data and = for padding. This encoding processes data as 24 bit groups and maps the data to four encoded characters. Every 6 bits of the 24 bit group serves as an index to a mapping table to obtain a character for the encoded data. Of course other implementations now known or later developed may also be used.

The selected assertions may be identified using a bit vector, wherein the bit vector includes one bit for each assertion in the policy, and a bit is set (e.g., the bit value is one) only if the corresponding assertion is selected. The binary value may be encoded as a text value (e.g., base64) for inclusion in the policy digest in XML format.

For purposes of illustration, a bit vector 330 may be generated by iterating through each assertion 315 in the policy 310, and in parallel, iterating through each bit 331*a-d* in the bit vector 330. For example, the first assertion A1 may correspond to the first bit 331*a*, the second assertion A2 may correspond to the second bit 331*b*, and so forth. Bit values are assigned to each assertion to indicate whether the assertion is selected to satisfy the policy. The corresponding bit is assigned a bit value of "1" if the assertion is selected and a bit value of "0" if the assertion is not selected. The resulting bit vector 330 represents the policy digest 320.

The policy digest may be included in a message 340, e.g., as part of the header 345. When message 340 is received by host 350, the policy digest is extracted from the message 340 and decoded (e.g., using a table) to reconstruct the policy digest 320 at the host 350. The policy digest 320 is then compared to the host policy 360. If the policy digest 320 indicates that the client is complying with a valid policy, the client 300 may be granted access to the requested resource. Alternatively, if the policy digest 320 indicates that the cached policy 310 is invalid, the host 350 issues a fault 370. Fault 370 may indicate to the client 300 that the cached policy 310 is invalid.

In another illustrative implementation, a policy digest may be generated as follows. The policy assertions are first placed in canonical (alphabetical) order:

```
<Policy>
    <FirstAssertion/>
    <SecondAssertion/>
    <SecurityAssertion>
        <Feature1/>
        <Feature2>
            <Annotation> first stuff for service </Annotation>
        </Feature2>
        <Feature3/>
        <Annotation> second stuff </Annotation>
    </SecurityAssertion>
```

-continued

```
    <XAlmostLastAssertion>
        <FeatureA>
        <FeatureB>
        <Annotation> stuff for AlmostLast </Annotation>
    </XAlmostLastAssertion>
    <XLastAssertion/>
</Policy>
```

The policy is then pruned:

```
<Policy>
    <FirstAssertion/>
    <SecondAssertion/>
    <TrickySecurityAssertion>
        <Feature1/>
        <Feature2/>
        <Feature3/>
    </TrickySecurityAssertion>
    <XAlmostLastAssertion>
        <FeatureA>
        <FeatureB>
    </XAlmostLastAssertion>
    <XLastAssertion/>
</Policy>
```

The pruned policy is converted to a string (stream of bytes), for example, using standard security XML Qname, white space, namespace, etc., canonicalization. The string is MD5 hashed, and the resulting 128 bit number converted to base 64. The encoded bit vector is then placed in either the fh or mh attribute of the <SelectedPolicy> header.

The SelectedPolicies SOAP header block may be used to communicate both which policies are applied and how they are applied in the construction of the message. The normative schema outline for the SelectedPolicies header block is:

```
<nsp:SelectedPolicies
        xmlns:nsp="http://schemas.microsoft.com/net/2003/09/policy"
        S:mustUnderstand="xs:boolean"?
        S:role="xs:anyURI"?
        S:relay="xs:boolean"?
        ... >
    <nsp:SelectedPolicy Digest="xs:base64Binary"
            DigestAlgorithm="xs:QName"?
            ... >
        <nsp:SelectedAssertions>xs:base64Binary</nsp:SelectedAssertions>
        ...
    </nsp:SelectedPolicy> +
    ...
</nsp:SelectedPolicies>
```

If the digest does not correspond to a known policy at the host, or if the cached policy has expired, the host may generate a SOAP Fault:

```
S:Code/S:Value: S:Sender
S:Code/S:Subcode/S:Value: nsp:PolicyUnknown
S:Reason: "Unknown policy"
S:Detail/nsp:SelectedPolicy: the child of the SelectedPolicies header
block with the
digest of the unknown or expired policy.
```

The bit vector is computed over the assertions that appear within the policy before including any expressions referenced by an embedded policy reference. If a referenced expression is selected to satisfy the policy, a separate SelectedPolicy child is included in the SelectedPolicies header block to indicate which assertions were selected within that expression. The additional SelectedPolicy children follow the SelectedPolicy child for the referencing policy in the order in which they are referenced.

This rule may apply whether the referenced expression was referenced by the initial policy or by some referenced expression. For example, if Policy A is selected and references Policy B and then Policy C, and if Policy B references Policy B1 and then B2, then the SelectedPolicies header block would contain five SelectedPolicy children in the following order: A, B, B1, B2, C.

If the bit vector does not indicate a valid satisfaction of the overall policy, if the bit vector is invalid or incorrectly encoded, or if the message does not satisfy the overall policy in the way indicated by the bit vector, a host generates a SOAP Fault:

---

S:Code/S:Value: S:Sender
S:Code/S:Subcode/S:Value: nsp:PolicySelectionInvalid
S:Reason: "Invalid set of assertions and policy references selected"
S:Detail/nsp:SelectedPolicy: the child of the SelectedPolicies header block with the
incorrect bit vector.

---

As another illustrative implementation, a policy digest may be generated as follows. The selected assertions are underlined in the following cached policy (referred to as P).

---

```
<wsp:Policy
        xmlns:wsp='http://schemas.xmlsoap.org/ws/2002/12/policy'
        xmlns:x='http://example.org'>
    <wsp:OneOrMore>
        <wsp:All>
            <x:A1>abc</x:A1>
            <x:A2 x="123"/>
        </wsp:All>
        <x:A3 />
        <x:A4 />
    </wsp:OneOrMore>
    <x:A5 y="123">abc</x:A5>
</wsp:Policy>
```

---

Removing all insignificant white space from cached policy P results in the following representation (referred to as P1'):

---

```
<wsp:Policy xmlns:wsp='http://schemas.xmlsoap.org/ws/2002/12/policy'
xmlns:x='http://example.org'><wsp:OneOrMore><wsp:All><x:A1>abc</x:A1><x:A2
x="123"/></wsp:All><x:A3/><x:A4/></wsp:OneOrMore><x:A5
y="123">abc</x:A5></wsp:Policy>
```

---

The policy identity may be computed as follows. The MD5 hash of P1' may be represented in hexadecimal digits as "5faaa79650ae2010a9646174f84ca60a". The base64 encoding represented in text characters is "X6qn1lCulBCpZGFO+EymCg==".

The selected assertions within that policy can be identified as follows. Since there are five assertions in P1 (A1, A2, ..., A5), there is a five-bit vector. The bit vector corresponding to the selected assertions indicated above in binary digits is "11101", or in hexadecimal digits is "1d". The equivalent base64 encoding represented in text characters is "HQ=".

In another illustrative implementation, a policy digest may be generated for a normalized policy as follows. A policy in normal form has exactly one "OneOrMore" operator whose only children are "All" operators. Each All operator has only children which are assertions. Each of the All operators is sometimes called an "assertion set" (also referred to as a "row"). As an illustration, the normal form of policy P1 (above) is shown in the following cached policy (referred to as NP1).

---

```
<wsp:Policy
        xmlns:wsp='http://schemas.xmlsoap.org/ws/2002/12/policy'
        xmlns:x='http://example.org' >
    <wsp:OneOrMore>
        <wsp:All>
            <x:A1>abc</x:A1>
            <x:A2 x="123"/>
            <x:A3 />
            <x:A5 y="123">abc</x:A5>
        </wsp:All>
        <wsp:All>
            <x:A1>abc</x:A1>
            <x:A2 x="123" />
            <x:A4 />
            <x:A5 y="123">abc</x:A5>
        </wsp:All>
    </wsp:OneOrMore>
</wsp:Policy>
```

---

NP1 is semantically equivalent to P1. The selected assertion set in NP1 (illustrated by underlining) is equivalent to the selected assertions in P1 above. Removing all insignificant white space from cached policy NP1 results in the following representation (referred to as AS1'):

<wsp:All><x:A1>abc</x:A1><x:A2 x="123"/><x:A3/><x:A5 y="123">abc</x:A5></wsp:All>

The policy digest may then be computed as a row hash. According to such an implementation, the rows still correspond to the rows in the host policy and the policy digest is valid even if the host policy expands. For example, the MD5 hash of AS1' represented in hexadecimal digits is "15b157f6ed9d592ba9c83bb5830a948d". The base64 encoding represented in text characters is "FbFX9u2dWSupyDu1gwqUjQ==".

It is noted that the above implementations are provided for purposes of illustration. Still other implementations are also contemplated.

Exemplary Operations

Described herein are exemplary methods for implementing invalid policy detection in a network environment. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement invalid policy detection in a network environment.

Figure 4:
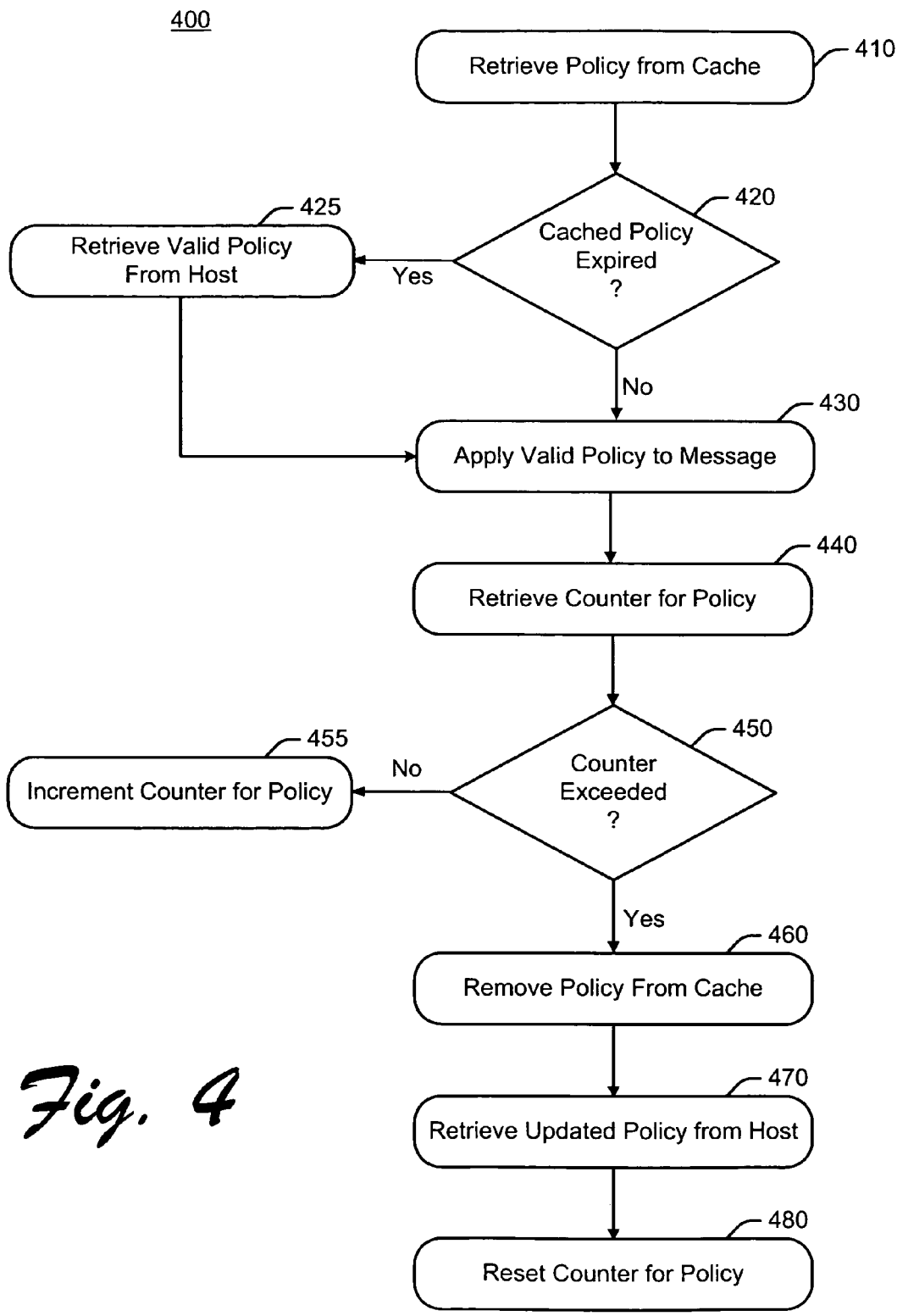
FIGS. 4-6 are flowcharts illustrating exemplary operations to implement invalid policy detection.

FIG. 4 is a flowchart illustrating exemplary operations 400 that may be implemented to detect an invalid policy. The exemplary operations may be implemented, e.g., at a client, to "age" one or more policies stored in cache. A policy may be removed from the cache after a specified time (e.g., a limit value) to reduce the use of invalid or expired policies. In an exemplary implementation, the limit value may be specified based on how the system is used. For example, if thousands of messages are being sent per second to a host producing 1% faults, it is acceptable to have a relatively high limit value specified in the hundreds. However, in a more reliable system a lower limit value may be specified.

In operation 410, the client may retrieve a policy from cache. For example, the policy may have been stored in cache during a previous communication with the host. In operation 420, the policy is evaluated at the client to determine whether the policy is expired. If the policy is expired, the client retrieves a current policy from the host in operation 425. In operation 430, the client applies the policy to the messages it sends to the host.

In operation 440, the client retrieves a counter corresponding to use of the policy. The counter is evaluated in operation 450. If the counter does not exceed a limit value, the counter is incremented in operation 455 to indicate that the policy has been used. Alternatively, if the counter exceeds the limit value in operation 450, the client removes the policy from cache in operation 460 so that the policy cannot be used again. A current policy is retrieved in operation 470 for communications with the host. The counter is reset in operation 480 for the new policy.

It is noted that the counter can be incremented at any desired rate, and a policy may expire at any desired count. For example, the counter may be incremented by 1 count each time the policy is used and the policy may expire when the counter exceeds 300. However, the counter may be incremented by 100 each time the client receives a fault to "age" the policy at a faster rate.

It is also noted that the client can retrieve the current policy from the host in operation 470 at any suitable time, and the policy does not need to be retrieved immediately upon removing the expired policy from cache. For example, the client may retrieve the current policy from the host when other processes are idle, or during off-peak hours for network traffic. As another example, the client may retrieve the current policy from the host the next time that the client attempts to communicate with the host.

Figure 5:
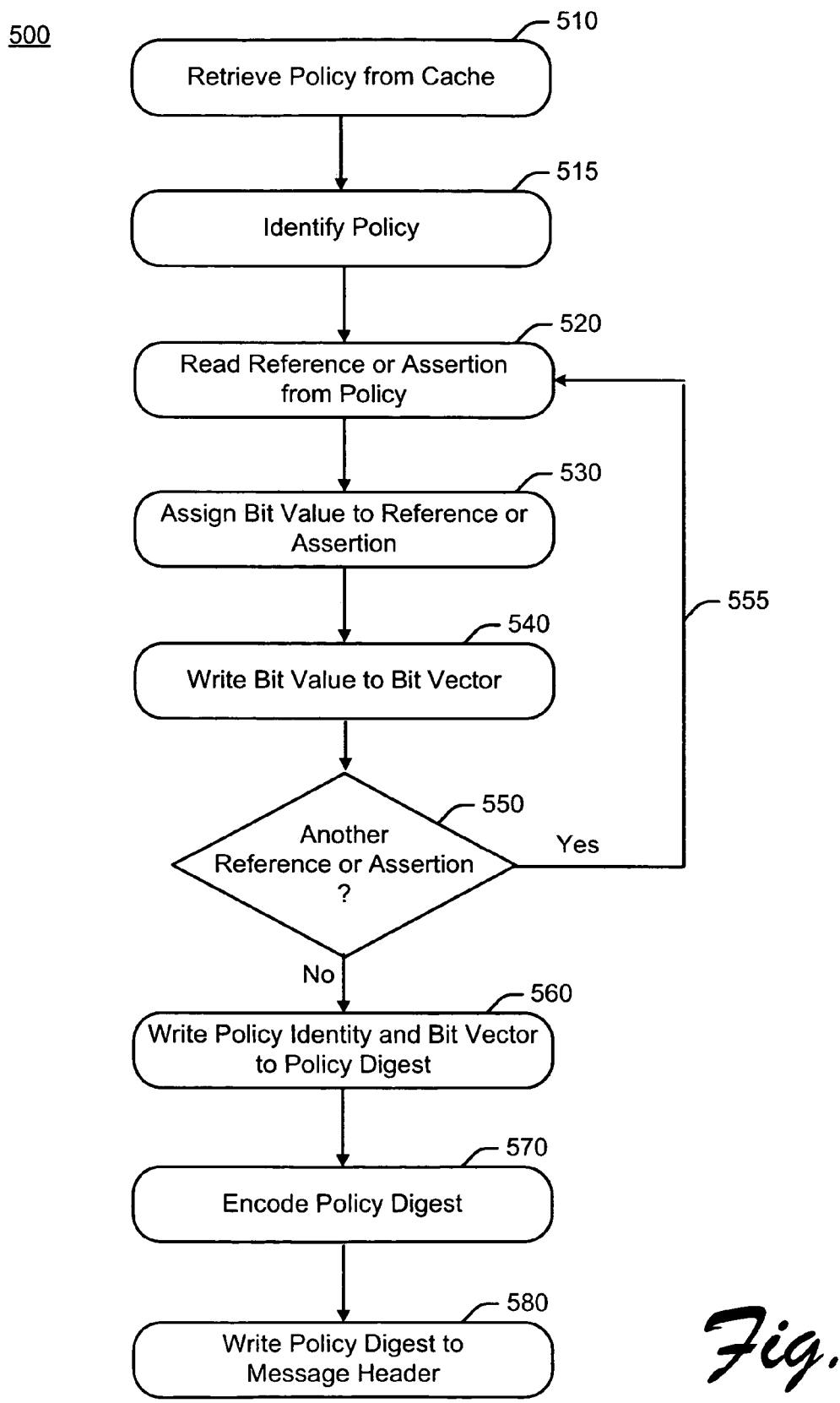

FIG. 5 is a flowchart illustrating exemplary operations 500 that may be implemented to detect an invalid policy. The operations may be implemented, e.g., at a client to generate a policy digest of one or more cached policies. The policy digest may be included in a message to the host so that the host can determine if the client is using a valid policy.

In operation 510 the client retrieves a policy from cache. For example, the cached policy may have been written to cache during a previous communication with the host. In operation 515, the policy is identified. In operation 520, an assertion is read from the cached policy. In operation 530, the assertion is assigned a bit value. For example, the bit value may be "1" if the assertion is selected and "0" if the assertion is not selected. The bit value is written to a bit vector in operation 540. In operation 550, it is determined whether the policy includes another assertion. If the policy includes another assertion, the process returns (illustrated by arrow 555) to operations 520-540, where the assertion is read, assigned a bit value, and written to a bit vector.

If the policy does not include further assertions, the bit vector and policy identity are written to the policy digest in operation 560. In operation 570, the policy digest is encoded. The policy digest is written to the message header in operation 580.

It is noted that the operations described with regard to FIG. 5 may be applied to multiple policies. For example, a policy digest may be computed for a group of policies, and bit vectors may be computed for each assertion across all of the policies. In addition, the operations are not limited to any particular order. For example, the policy identity and bit vector do not need to be written to the policy digest at the same time or in any particular order.

Figure 6:
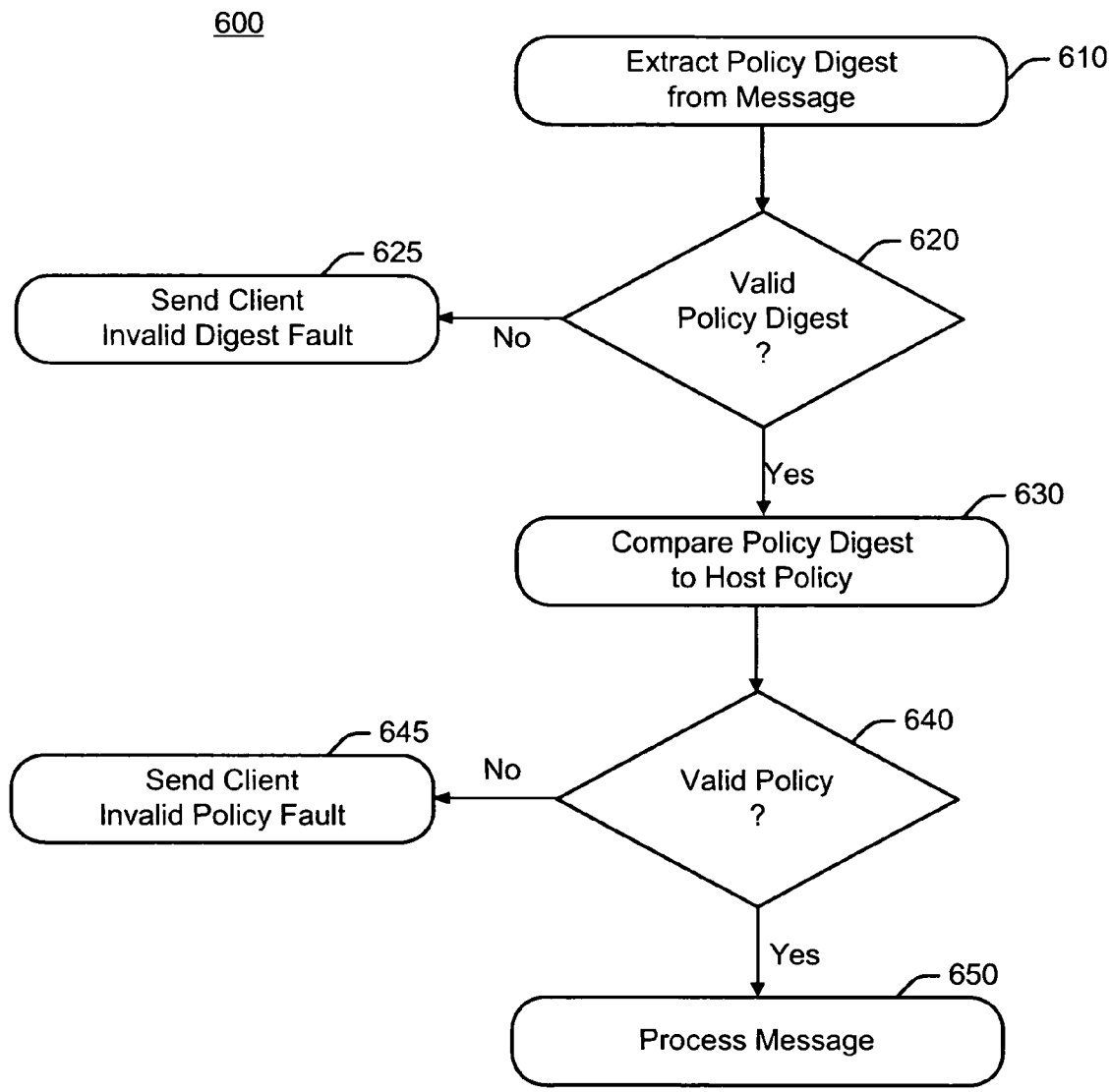

FIG. 6 is a flowchart illustrating exemplary operations 600 that may be implemented to detect an invalid policy. The operations may be implemented, e.g., at a host to extract a policy digest from a message. The policy digest may be evaluated to determine if the client is using a valid policy and which assertions the client is complying with.

In operation 610 the host extracts a policy digest from a message, e.g., from the message header. In operation 620, the policy digest is evaluated, e.g., to determine the policy identity and the length of the bit vector. If the policy digest is invalid (e.g., incorrect policy identity and/or bit vector length), the host generates an invalid digest fault in operation 625. In an exemplary implementation, the fault is identified as an invalid digest fault, indicating that the policy itself is invalid.

The host may return the invalid digest fault to the client so that the client can remove the policy from cache. It is noted that when the host determines that the digest is itself invalid, the host does not need to evaluate the contents of the policy digest, e.g., for selected references and/or assertions. Accordingly, these operations save time and reduce the burden on processing resources at the host. The client is quickly notified that the cache is invalid and can request a current policy from the host.

If the policy is itself valid, the host may evaluate the selected assertions in the policy digest. In operation 630 the assertions identified in the policy digest are compared those in the host policy. In operation 640, a determination is made whether the client's cached policy is valid, e.g., based on the selected assertions and/or references contained in the policy digest. If the assertions are invalid, the host generates an invalid policy fault in operation 645. In an exemplary implementation, the fault is identified as an invalid policy fault, indicating that the policy is invalid. The host may return the invalid policy fault to the client so that the client can remove the policy from cache.

If on the other hand the policy is valid, the host may process the message in operation 650, and communication can be established between the client and the host.

Exemplary Computing Device

FIG. 7 is a schematic illustration of an exemplary computing device 700 that can be utilized to implement a host. Computing device 700 includes one or more processors or processing units 732, a system memory 734, and a bus 736 that couples various system components including the system memory 734 to processors 732. The bus 736 represents one or more of any of several types of bus structures, including a memory bus or memory controller, a peripheral bus, an accelerated graphics port, and a processor or local bus using any of a variety of bus architectures. The system memory 734 includes read only memory (ROM) 738 and random access memory (RAM) 740. A basic input/output system (BIOS) 742, containing the basic routines that help to transfer information between elements within computing device 700, such as during start-up, is stored in ROM 738.

Computing device 700 further includes a hard disk drive 744 for reading from and writing to a hard disk (not shown), and may include a magnetic disk drive 746 for reading from and writing to a removable magnetic disk 748, and an optical disk drive 750 for reading from or writing to a removable optical disk 752 such as a CD ROM or other optical media. The hard disk drive 744, magnetic disk drive 746, and optical disk drive 750 are connected to the bus 736 by appropriate interfaces 754a, 754b, and 754c. The drives and their associated computer-readable media provide nonvolatile storage of computer-readable instructions, data structures, program modules and other data for computing device 700. Although the exemplary environment described herein employs a hard disk, a removable magnetic disk 748 and a removable optical disk 752, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 744, magnetic disk 748, optical disk 752, ROM 738, or RAM 740, including an operating system 758, one or more application programs 760, other program modules 762, and program data 764. A user may enter commands and information into computing device 700 through input devices such as a keyboard 766 and a pointing device 768. Other input devices (not shown) may include a microphone, joystick, game pad, satellite dish, scanner, or the like. These and other input devices are connected to the processing unit 732 through an interface 756 that is coupled to the bus 736. A monitor 772 or other type of display device is also connected to the bus 736 via an interface, such as a video adapter 774.

Generally, the data processors of computing device 700 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory.

Computing device 700 may operate in a networked environment using logical connections to one or more remote computers, such as a remote computer 776. The remote computer 776 may be a personal computer, a server, a router, a network PC, a peer device or other common network node, and typically includes many or all of the elements described above relative to computing device 700. The logical connections depicted in FIG. 7 include a LAN 780 and a WAN 782.

When used in a LAN networking environment, computing device 700 is connected to the local network 780 through a network interface or adapter 784. When used in a WAN networking environment, computing device 700 typically includes a modem 786 or other means for establishing communications over the wide area network 782, such as the Internet. The modem 786, which may be internal or external, is connected to the bus 736 via a serial port interface 756. In a networked environment, program modules depicted relative to the computing device 700, or portions thereof, may be stored in the remote memory storage device. It will be appreciated that the network connections shown are exemplary and other means of establishing a communications link between the computers may be used.

Hosts may include host adapter hardware and software to enable a connection to the communication network. The connection to communication network may be through an optical coupling or more conventional conductive cabling depending on the bandwidth requirements. A host adapter may be implemented as a plug-in card on computing device 700. Hosts may implement any number of host adapters to provide as many connections to communication network as the hardware and software support.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
    receiving a policy at a client from a host, the policy including a number of assertions for the client to comply with in order to access one or more resources via the host, wherein the policy is cached at the client, and wherein the client is configured to generate policy digests;
    determining, at the client, that the client is complying with at least one assertion;
    generating a policy digest at the client for the cached policy by reading each of the at least one assertions from the policy, assigning a respective bit value to each of the at least one assertions, and writing each respective bit value to a bit vector, the policy digest identifying the at least one assertion; and
    sending a message from the client to the host to access a resource via the host, the message including the policy digest.

2. The method of claim 1, wherein generating the policy digest includes generating a hash of the cached policy.

3. The method of claim 1, wherein generating the policy digest includes encoding the bit vector, the bit vector identifying selected assertions from the cached policy.

4. The method of claim 1, wherein generating the policy digest includes generating a hash of the cached policy if the cached policy is normalized.

5. The method of claim 1, further comprising:
    incrementing a counter at the client each time the cached policy is used; and
    removing the cached policy from a cache at the client when the counter exceeds a limit value.

6. The method of claim 1, further comprising:
    incrementing a counter at the client for the cached policy when a fault is received at the client in response to using the cached policy; and
    removing the cached policy from a cache at the client when the counter exceeds a limit value.

7. The method of claim 1, further comprising logging a diagnostic event at the client when a fault is received at the client to identify a system problem.

8. A method comprising:
    sending a policy from a host to a client, the policy including a number of assertions for the client to comply with in order to access one or more resources via the host, and wherein the host is configured to implement a host messaging module;
    extracting a policy digest from a message received at the host from the client, the policy digest indicating that the client is complying with at least one assertion of the number of assertions of the policy in order to access the one or more resources via the host and the policy digest including a bit vector identifying the at least one assertion;

returning, by the host, an invalid digest fault to the client when a length of the bit vector is not valid; and determining, by the host, whether the at least one assertion is valid when the length of the bit vector is valid.

9. The method of claim 8, further comprising issuing a fault at the host for the client if the policy digest identifies an invalid policy.

10. The method of claim 8, further comprising decoding the policy digest at the host.

11. The method of claim 8, further comprising decoding the bit vector at the host.

12. The method of claim 8, further comprising reading an assertion from the policy digest at the host.

13. The method of claim 8, further comprising reading a row hash of the policy at the host.

14. A system comprising:

a processing unit; and a system memory accessible to the processing unit, the system memory including:

a message processor to:

receive a message from a client to access a resource; and extract a policy digest from the message, the policy digest indicating that the client is complying with one or more of a number of assertions of a policy in order to access one or more resources via the system and the policy digest including a bit vector identifying the one or more assertions; and a fault generator to:

return an invalid digest fault to the client when a length of the bit vector is not valid; and determine whether the one or more assertions are valid when the length of the bit vector is valid.

15. The system of claim 14, wherein the message processor is configured to decode the policy digest.

16. The system of claim 14, wherein the fault generator is configured to return an invalid policy fault to the client when at least one of the one or more assertions specified in the policy digest is invalid.

17. The system of claim 14, wherein the policy digest is a row hash of a normalized policy.

18. The system of claim 14, wherein the policy digest identifies at least one selected assertion.

19. A system comprising:

a processor; and a memory accessible to the processor, the memory including:

a digest generator to:

generate a policy digest based on one or more policies received at a client from a host, the one or more policies each specifying at least one assertion that the client must comply with in order to access a resource via the host; and place a bit vector in a header of a message to access a particular resource of the host, the bit vector including one bit for each assertion of a particular policy and including one bit for each assertion of an additional policy referenced by the particular policy.

20. The system of claim 19, further comprising a messaging module to encode the policy digest.

21. The system of claim 19, further comprising a cache including the one or more policies.

22. The system of claim 19, wherein the policy digest is a row hash of a normalized policy.

23. The system of claim 19, wherein the policy digest identifies at least one assertion selected by the client.

24. One or more computer-readable storage media encoding a computer program for executing on a computer system a computer process, the computer process comprising:

receiving a policy at a client from a host, the policy including a number of assertions for the client to comply with in order to access one or more resources via the host, and wherein the policy is cached at the client;

determining, at the client, that the client is complying with at least one assertion;

generating a policy digest at the client for the cached policy, the policy digest identifying the at least one assertion the client is complying with;

sending a message from the client to the host, the message including a request to access a particular resource via the host and the message including the policy digest;

receiving a fault at the client from the host, the fault indicating that the policy is invalid;

removing the policy from a cache at the client in response to receiving the fault; and sending a request from the client to the host for a valid policy after removing the policy from the cache.

25. The one or more computer-readable storage media of claim 24 wherein the computer process further comprises generating a hash of the cached policy.

26. The one or more computer-readable storage media of claim 24 wherein the computer process further comprises encoding a bit vector of the cached policy.

27. The one or more computer-readable storage media of claim 24 wherein the computer process further comprises reading an assertion from the policy, assigning a bit value to the assertion, and writing the bit value to a bit vector.

28. The one or more computer-readable storage media of claim 24 wherein the computer process further comprises generating a row hash of the cached policy if the cached policy is normalized.

29. The one or more computer-readable storage media of claim 24, wherein the computer process further comprises:

incrementing a counter each time the cached policy is used; and removing the cached policy from a cache at the client when the counter exceeds a limit value.

30. The one or more computer-readable storage media of claim 24 wherein the computer process further comprises:

incrementing a counter for the cached policy when the fault is received at the client in response to using the cached policy; and removing the cached policy from the cache at the client when the counter exceeds a limit value.

31. The one or more computer-readable storage media of claim 24 wherein the computer process further comprises triggering a diagnostic event when the fault is received at the client.

32. One or more computer-readable storage media encoding a computer program for executing on a computer system a computer process, the computer process comprising:

extracting at a host a policy digest included in a message from a client, the policy digest indicating that the client is complying with an assertion required to access a resource via the host, the assertion is associated with a policy, and the policy digest includes a bit vector identifying the assertion;

returning, by the host, an invalid digest fault to the client when a length of the bit vector is not valid; and determining, by the host, whether the assertion is valid when the length of the bit vector is valid.

33. The one or more computer-readable storage media of claim 32 wherein the computer process further comprises decoding the policy digest.

34. The one or more computer-readable storage media of claim 32 wherein the computer process further comprises decoding the bit vector.

35. The one or more computer-readable storage media of claim 32 wherein the computer process further comprises reading the assertion from the policy digest.

36. The one or more computer-readable storage media of claim 32 wherein the computer process further comprises reading a row hash of the policy if the policy is normalized.

* * * * *